Figure 1:
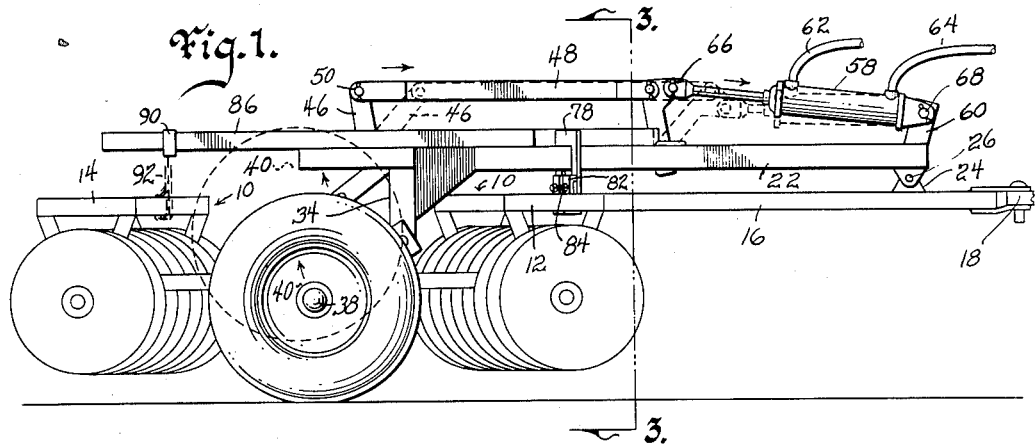

Inventors
David A. Bennett
& Roy E. Bennett
by M. Talbert Dick
Attorney

Witness
Edward P. Feeley

July 17, 1956
D. A. BENNETT ET AL
MOUNTED AGRICULTURAL IMPLEMENT
TRANSPORT AND DEPTH CONTROL
2,754,647
Filed June 4, 1953
2 Sheets-Sheet 2
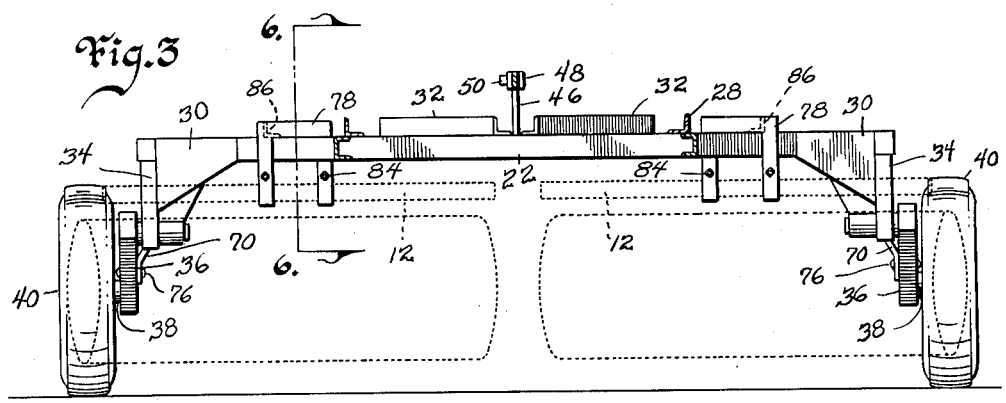
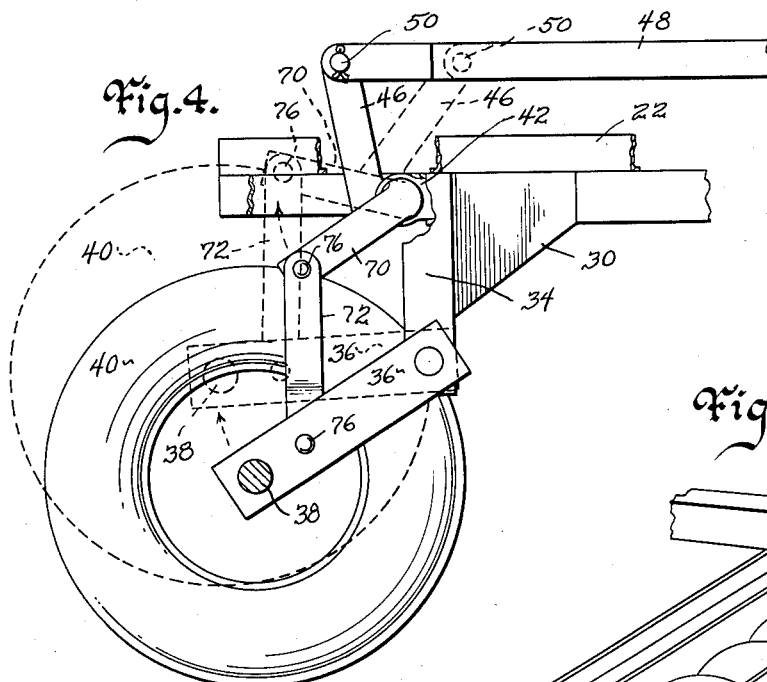
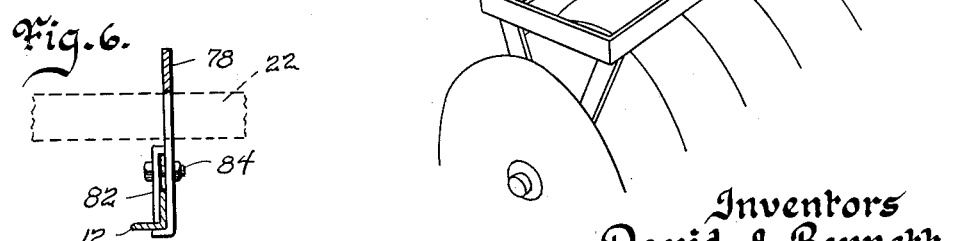
Witness
Edward P. Seeley
Inventors
David A. Bennett
& Roy E. Bennett
by M. Talbert Dick
Attorney

United States Patent Office 2,754,647
Patented July 17, 1956

2,754,647

MOUNTED AGRICULTURAL IMPLEMENT TRANSPORT AND DEPTH CONTROL

David A. Bennett and Roy E. Bennett, Lenox, Iowa

Application June 4, 1953, Serial No. 359,484

9 Claims. (Cl. 55—73)

Our invention relates to transports for farm implement depth control and is of the mounted type that also provides for depth control of the implement when in use.

There are numerous farm implement transports that are well known and many discs and the like are now being constructed which incorporate transports therein as a permanent part of the structure. Many of these can be so arranged as to regulate the depth to which the implement will penetrate the earth when in use. Of this type of implement transport known to us, however, all have a rigid frame which causes the work of the implement to be somewhat irregular on uneven ground.

There are also a great many units designed to act substantially exclusively as a means for transporting a farm implement over highways and the like without dulling the earth working portions of the implement. Most of the strictly transport type of devices with which we are familiar have no means provided on them for regulating the height to which the implement is raised. It is either completely raised or raised not at all. In many cases of the transport devices, the very act of securing them to an implement causes the implement to be lifted. Under these conditions it is clear that no depth regulation can be had. Furthermore, many of the transports now known are not well adapted to lifting multiple gang implements. Those that are capable of lifting multiple discs or the like are extremely cumbersome and are not well adapted to regulating the operating depth of the implement.

In view of the foregoing, therefore, it is the principal object of our invention to provide a mounted agricultural implement transport and depth control that can be secured to an implement and left there secured during use of the implement or that can be easily removed when desired.

It is a further object of our invention to provide a mounted agricultural implement transport and depth control that does not interfere with the normal flexibility of flexible farm implements.

It is a further object of our invention to provide a mounted agricultural implement transport and depth control that controls the depth to which a farm implement will enter the ground by having close control over the height to which the wheels are elevated relative to the implement on which it is mounted.

It is a further object of our invention to provide a mounted agricultural implement transport and depth control that is durable in use, economical to manufacture, and refined in appearance.

These and other objects will be apparent to those skilled in the art.

Figure 2:
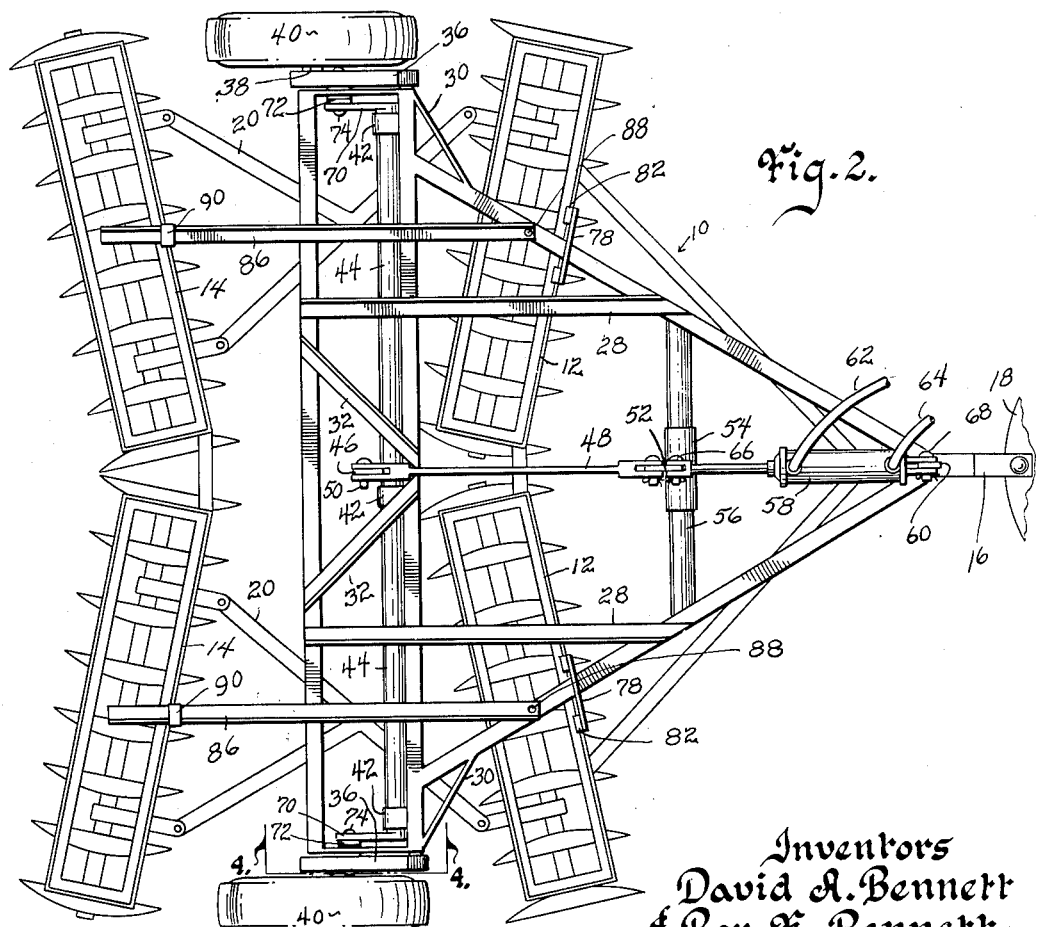

Our invention consists in the construction, arrangement, and combination of the various parts of the device, whereby the objects contemplated are attained as hereinafter more fully set forth, and specifically pointed out in our claims, and illustrated in the accompanying drawings, in which:

Fig. 1 is a side elevation view of our mounted agricultural implement transport and depth control shown mounted on a disc which is elevated; broken lines illustrate an adjusted position of the transport relative to the disc, Fig. 2 is a plan view of our device secured to a disc, Fig. 3 is a partial front elevation view of our transport taken on the line 3—3 of Fig. 1 and with the disc shown only in broken lines, Fig. 4 is an enlarged side elevation view of the wheel raising and lowering linkage taken on the line 4—4 of Fig. 2; broken lines illustrate an adjusted position of the wheels, Fig. 5 is an enlarged perspective detailed view of the forward hanger and a fragment of a disc, and Fig. 6 is an enlarged detailed vertical sectional view of a front hanger taken on the line 6—6 of Fig. 3.

Referring to the drawings we have used the numeral 10 to designate a farm implement such as a disc which is used for illustration. This disc has forward and rear elements having frames designated 12 and 14 respectively. A tongue is secured to the forward element 16 to provide means for securing it to the drawbar 18 of a draft vehicle (not shown) such as a farm tractor or the like. The rear element is secured to the forward element by the links 20. As may be obvious to those skilled in the art, the farm implement disclosed is a flexible one that will adapt itself to a considerable extent to the terrain over which it is drawn. This is a very desirable characteristic and one that many transports destroy by requiring a rigid disc or other implement frame for the transport wheels to lift. It is one of applicants' main aims to avoid restricting the flexibility of the disc or like.

To this end we have provided for our transport a rigid triangular frame 22 that extends straight back over the top of the disc frame from a pierced ear 24 that is secured to tongue 16 and to which the forward end of the frame 22 is pivotally secured by a pin 26. The frame is provided with numerous straight braces such as the ones 28 and diagonal braces such as the ones 30 and 32. Near the rear end of the triangular frame is a pair of downwardly extending wheel supports or fulcrums 34. A pivot link 36 is mounted on each of these wheel supports or fulcrums 34 to swing in a vertical arc. Each pivot link is provided with a stub shaft or axle 38 on which the wheels 40 are rotatably mounted. Near top of wheel supports 34 are several spaced apart bearings 42 which pivotally support the torque tube 44. A lever arm 46 is secured to the torque tube and extends upwardly therefrom as shown in Figs. 1 and 4. An elongated element 48 is pivotally secured to arm 46 by any suitable means such as the pin 50. The elongated element 48 extends forward to and is secured to the pivot arm 52 which is rigidly secured to the collar 54. The collar 54 is pivotally mounted on the tube 56 that is secured across the frame 22 as shown in Fig. 2. The tube not only serves as a pivot for collar 54 but also braces the frame additionally by forming a small triangle within the large triangle. A hydraulic cylinder 58 is pivotally secured to pivot arm 52 and also to a rigid arm 60 secured to the forward end of the transport frame 22. We have shown this cylinder as a double acting one, and, therefore, provided with two hydraulic hoses 62 and 64 which lead to an appropriate valve of a well known type usually located on the draft vehicle and hence not shown. Any appropriate means such as the pins 66 and 68 are used to secure the hydraulic cylinder to the pivot arm and the rigid arm respectively.

On each end of the torque tube 44 is a wheel lever arm both of which are designated 70. These wheel lever arms are rigidly secured to the torque tube and their ends swing in a vertical arc whenever the torque tube is pivoted.

A pair of articulating links 72 are pivotally secured to the ends of the wheel lever arms by any reasonable means such as the pins 74 or the like. The other end of each articulating link is pivotally secured to its respective pivot link 36 in a customary manner as by the pins 76 or the like. When the cylinder is extended, therefore, the wheels are lowered as shown by the solid lines in Fig. 1. On the other hand, the wheels are retracted as the cylinder is shortened as illustrated by the broken lines in Fig. 1.

The disc or other farm implement is depended from the frame by means of rigid hangers as shown at 78 in Figs. 1, 2, 3, 5 and 6. The hangers are inverted U-shaped rigid elements having hooks on their lower ends as at 80. The inverted L-shaped members 82 are clamped to the hangers 78 by any suitable means such as the nut and bolt assemblies 84. The interaction between the frames 12, the hangers 78, the hanger hooks 80, and the inverted L-shaped members 82 secure the hangers rigidly to the frame of the implement as is shown clearly in Fig. 6. The hangers loosely embrace the side members of frame 22 and depend the forward frame of the disc or like a fixed distance below the frame 22 of the transport. When the device is used with a simple disc or like, the structure recited is all that is required.

In order to accommodate a multiple gang implement, however, the extension arms 86 are secured to the transport frame in any suitable manner as at 88. The arms extend over the rear of the rear of the frame 22 to free ends over which the collars 90 are slipped. Each collar supports a flexible element such as the chains 92 or equivalent which are used to secure the rear implement frame 14 to the extension arms. As may be seen in Fig. 1 the weight of the implement is rather evenly distributed in front and in back of the wheels 40 so that the implement is nicely balanced on the device. Since both the front and back implement frames are depended or hung from the transport frame, there is no interference with the flexible nature of the implement as originally constructed. The implement is free to flex in all directions within the limits of the hangers 80 and the chains 92. Also, it is clear that the wheels may be placed at any desired height and thereby control the depth to which the implement penetrates the ground. Furthermore, it is apparent that my implement transport is easily secured to and detached from the implement with which is is associated. Equally obvious is the fact that our transport relieves stresses placed on the disc or other implement tongue as when the usual transport that is secured to the rear of the implement is used. If desired the implement may be given additional weight for deep cultivation by raising the wheels until the weight of the transport is borne completely by the implement. The relative ruggedness and simplicity of our transport and depth control are believed clear from the illustrations and foregoing description. Clearly we have invented a device that accomplishes the objects of our invention.

We also wish to point out that our device supports the implement with a three point suspension. The two wheels are two of the points while the connection to the draw bar of the draft vehicle or the like is the other point. Because the implement is thus suspended, it is always stable whether its is being towed over highways or through fields. This extraordinary stability makes our transport one of unusual usefulness. It may be used for high speed transport of the implement from one farm to another if the owner of implement using our transport is farming more than one acreage and they are separated by a considerable distance. We consider this three point suspension to be an important result of the structure set out in the claims.

Some changes may be made in the construction and arrangement of our mounted agricultural implement transport and depth control without departing from the real spirit and purpose of our invention, and it is our intention to cover by our claims, any modified forms of structure or use of mechanical equivalents which may be reasonably included within their scope.

We claim:

1. In a farm implement transport and depth of cultivation control device, a rigid frame, wheel support fulcrums secured to and extending down therefrom near the rear sides thereof, pivot links pivotally secured to said wheel support fulcrums and pivotable in a vertical arc, stub axles secured to the free ends of said pivot links, wheels journalled on said stub axles, remotely controlled means for producing mechanical movement secured to said frame and operatively associated with said pivot links for pivoting them, means secured to the forward end of said rigid frame for securing it hingedly to a farm implement tongue near its front end, a pair of extension arms secured to said rigid frame forward of its back end and extending over the top rear of said rigid frame and in back thereof a substantial distance, flexible means secured near the rear ends of said extension arms for flexibly securing a farm implement frame thereto, and rigid inverted U-shaped hangers loosely embracing the side elements of said rigid frame and adapted to being rigidly secured to a farm implement frame.

2. The farm implement transport and depth of cultivation control device of claim 1 further characterized by said extension arms extending approximately the same distance in back as in front of the rear of said rigid frame.

3. The farm implement transport and depth of cultivation control device of claim 2 further characterized by said rigid inverted U-shaped hangers loosely embracing the sides of said rigid frame at a point only slightly in front of the forward ends of said extension arms.

4. In a farm implement transport and depth of cultivation control, a rigid frame, a means hingedly secured to said rigid frame and adapted to be secured to the tongue of a farm implement near its front, a pair of fulcrum elements secured to and extending down from the rear sides of said rigid frame, a pair of pivot links each pivotally secured to the lower end of one of said fulcrum elements, stub axles secured to said pivot links, wheels journalled on said stub axles, at least two bearings secured to said rigid frame and vertically spaced from said pivot links, a torque tube mounted in said bearing, a pair of wheel lever arms rigidly secured to the ends of said torque tube and extending in the same direction therefrom, a pair of articulating links each pivotally secured by one end to one of said wheel levers and having their other ends pivotally secured to said pivot links, a lever arm rigidly secured to said torque tube near its center, an elongated element pivotally secured to said lever arm at a distance from said torque tube, a tube having its ends secured to said rigid frame and positioned laterally thereon, a collar pivotally embracing said tube, a pivot arm secured to said collar; said pivot arm being pivotally secured to the other end of said elongated element, a hydraulic cylinder pivotally secured to said rigid frame and said pivot arm respectively, means secured to said hydraulic cylinder to control flow of hydraulic fluid under pressure thereto from a remote point, a pair of extension arms secured to said rigid frame forward of its back end and extending over the top rear of said rigid frame and in back thereof a substantial distance, flexible means secured near the rear ends of said extension arms for flexibly securing a farm implement frame thereto, and rigid inverted U-shaped hangers loosely embracing the side elements of said rigid frame and adapted to being rigidly secured to a farm implement frame.

5. The farm implement transport and depth of cultivation control device of claim 4 further characterized by said extension arms extending approximately the same distance in back of as in front of the rear of said rigid frame.

6. The farm implement transport and depth of cultivation control device of claim 5 further characterized by said rigid inverted U-shaped hangers loosely embracing the sides of said rigid frame at a point only slightly in front of the forward end of said extension arms.

7. The implement transport and depth of cultivation control device of claim 4 further characterized by said rigid inverted U-shaped hangers having hooks adapted to engage the bottom of a farm implement frame on the lower end of the legs of said rigid inverted U-shaped hangers, inverted L-shaped elements adapted to engage the top and one side of a farm implement frame, and means engaging said rigid inverted U-shaped hangers and said inverted L-shaped elements for drawing them together in a clamping action.

8. In a device of the class described, a rigid frame, wheels on said frame, a means for raising and lowering said wheels relative to said frame, two spaced apart flexible elements having their upper ends secured to the rear end portion of said rigid frame and their lower ends adapted to be secured to an earth conditioning implement, and two vertical inverted U-frame members spaced apart from each other and each loosely embracing a portion of the front end portion of said rigid frame; said inverted U-frame members adapted to have their lower ends secured to an earth conditioning element.

9. In a device of the class described, a rigid frame, wheels on said frame, a means for adjustably raising and lowering said wheels relative to said frame, two spaced apart flexible elements having their upper ends secured to the rear end portion of said rigid frame and their lower ends adapted to be secured to an earth conditioning implement, and two vertical inverted U-frame members spaced apart from each other and each loosely embracing a portion of the front end portion of said rigid frame; said inverted U-frame members adapted to have their lower ends secured to an earth conditioning element.

References Cited in the file of this patent

UNITED STATES PATENTS

| | | |
|---|---|---|
| 990,216 | Bedford | Apr. 25, 1911 |
| 1,421,047 | Ward | June 27, 1922 |
| 1,861,626 | Flatley | June 7, 1932 |
| 2,041,616 | Noell et al. | May 19, 1936 |
| 2,617,342 | Meissner | Nov. 11, 1952 |
| 2,621,458 | Douyard | Dec. 16, 1952 |
| 2,635,519 | Cook | Apr. 21, 1953 |
| 2,637,562 | Stratman | May 5, 1953 |
| 2,691,930 | Forgy | Oct. 19, 1954 |